US008310719B2

(12) United States Patent
Yabe

(10) Patent No.: US 8,310,719 B2
(45) Date of Patent: Nov. 13, 2012

(54) IMAGE PROCESSING APPARATUS, IMAGE PROCESSING METHOD, AND PROGRAM

(75) Inventor: Takashi Yabe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 780 days.

(21) Appl. No.: 12/430,796

(22) Filed: Apr. 27, 2009

(65) Prior Publication Data

US 2009/0284768 A1 Nov. 19, 2009

(30) Foreign Application Priority Data

May 13, 2008 (JP) ................................ 2008-126146

(51) Int. Cl.
*H04N 1/60* (2006.01)
(52) U.S. Cl. ......... 358/1.9; 358/2.1; 358/1.13; 358/406; 358/462; 358/504
(58) Field of Classification Search .................. 358/1.1, 358/1.9, 2.1, 1.13, 1.15, 1.16, 1.17, 3.03, 358/3.1, 406, 504, 448, 462, 518, 519, 521; 399/43
See application file for complete search history.

(56) References Cited

U.S. PATENT DOCUMENTS

| | | | | |
|---|---|---|---|---|
| 5,950,036 A | * | 9/1999 | Konishi | 399/8 |
| 6,185,007 B1 | * | 2/2001 | Hayashi et al. | 358/1.9 |
| 6,280,105 B1 | * | 8/2001 | Iida | 400/74 |
| 6,429,886 B2 | * | 8/2002 | Ohki | 347/115 |
| 6,483,609 B1 | * | 11/2002 | Ueno et al. | 358/434 |
| 6,676,309 B2 | * | 1/2004 | Shima | 400/61 |
| 7,298,527 B2 | | 11/2007 | Yabe | |
| 7,301,651 B2 | * | 11/2007 | Noda | 358/1.13 |
| 7,417,755 B2 | * | 8/2008 | Imaizumi et al. | 358/1.15 |
| 7,450,280 B2 | * | 11/2008 | Hayashi | 358/521 |
| 7,800,779 B2 | * | 9/2010 | Fan et al. | 358/1.9 |
| 2002/0140974 A1 | * | 10/2002 | Imaizumi et al. | 358/1.15 |
| 2002/0149799 A1 | * | 10/2002 | Hayashi | 358/406 |
| 2003/0053099 A1 | * | 3/2003 | Sakaguchi | 358/1.9 |
| 2003/0184804 A1 | * | 10/2003 | Mastie et al. | 358/1.16 |
| 2005/0190407 A1 | * | 9/2005 | Yokoyama | 358/2.1 |
| 2005/0200645 A1 | * | 9/2005 | Kobayashi | 347/19 |
| 2005/0280852 A1 | * | 12/2005 | Namizuka | 358/1.9 |
| 2006/0007465 A1 | * | 1/2006 | Hayashi | 358/1.13 |
| 2006/0140650 A1 | * | 6/2006 | Yokote | 399/27 |
| 2006/0171001 A1 | * | 8/2006 | Kitagawa et al. | 358/521 |
| 2006/0203256 A1 | * | 9/2006 | Hagiwara | 358/1.1 |
| 2006/0215212 A1 | * | 9/2006 | Tao | 358/1.14 |
| 2006/0221379 A1 | * | 10/2006 | Noda | 358/1.14 |
| 2007/0047805 A1 | * | 3/2007 | Ohtsu | 382/164 |
| 2007/0058999 A1 | * | 3/2007 | Tao | 399/38 |

(Continued)

FOREIGN PATENT DOCUMENTS

JP 2003-270868 9/2003

(Continued)

*Primary Examiner* — Kimberly A Williams
(74) *Attorney, Agent, or Firm* — Fitzpatrick, Cella, Harper & Scinto

(57) ABSTRACT

The present invention provides an image processing apparatus able to shorten the processing time for automatic tone correction. The image processing apparatus includes: printing unit for conducting tone correction for bitmapping a print job, and then printing the tone-corrected bitmap data; automatic tone correcting unit for conducting automatic tone correction while the printing unit is processing the print job; and configuring unit for configuring an image quality mode for printing by the printing unit. Depending on the image quality mode configured by the configuring unit, the automatic tone correction conducted by the automatic tone correcting unit while the print job is being processed may not be conducted.

9 Claims, 23 Drawing Sheets

U.S. PATENT DOCUMENTS

| | | | |
|---|---|---|---|
| 2007/0070460 A1* | 3/2007 | Yamada | 358/504 |
| 2007/0097439 A1* | 5/2007 | Yamada | 358/3.1 |
| 2007/0121563 A1* | 5/2007 | Park | 370/338 |
| 2007/0139733 A1* | 6/2007 | Mizes et al. | 358/504 |
| 2007/0165255 A1* | 7/2007 | Takeuchi | 358/1.9 |
| 2008/0024844 A1 | 1/2008 | Yabe | |
| 2008/0151278 A1* | 6/2008 | Sekiguchi et al. | 358/1.9 |
| 2008/0181448 A1* | 7/2008 | Kato | 382/100 |
| 2009/0041484 A1* | 2/2009 | Kitagawa et al. | 399/43 |
| 2009/0180127 A1 | 7/2009 | Yabe | |
| 2009/0225370 A1* | 9/2009 | Gotoh et al. | 358/3.03 |
| 2009/0297189 A1* | 12/2009 | Saiki | 399/49 |
| 2011/0311245 A1* | 12/2011 | Inada et al. | 399/31 |

FOREIGN PATENT DOCUMENTS

JP    2005-111714    4/2005

* cited by examiner

| JOB SETTINGS | | | | AUTOMATIC TONE CORRECTION DURING JOB Y/N | | | | | | | |
|---|---|---|---|---|---|---|---|---|---|---|---|
| COPY | DPL | | | COPY | | | DPL | | | | |
| | | | | | | | 600dpi | | | 1200dpi | |
| ORIGINAL MODE | RESOLUTION | HALFTONE | ERROR DIFFUSION | TONE | HIGH-RESOLUTION | RESOLUTION | TONE | HIGH-RESOLUTION | RESOLUTION | TONE |
| — | 600 | TONE | N | N | N | N | Y | N | N | N |
| — | 600 | STANDARD | N | N | Y | N | Y | N | N | N |
| — | 1200 | STANDARD | N | Y | N | N | N | Y | N | Y |
| TEXT | — | — | Y | Y | N | N | N | N | N | N |
| PHOTOGRAPH | — | — | N | Y | N | N | N | N | N | N |
| TEXT/ PHOTOGRAPH | — | — | Y | Y | N | N | N | N | N | N |

FIG.15

| JOB SETTINGS | | | | | USED OBJECTS | | | AUTOMATIC TONE CORRECTION DURING JOB Y/N | | | | | |
|---|---|---|---|---|---|---|---|---|---|---|---|---|---|
| | | HALFTONE | | | | | | 600dpi | | | 1200dpi | | |
| RESOLUTION | HALFTONE | TEXT | GRAPHIC | IMAGE | TEXT | GRAPHIC | IMAGE | HIGH-RESOLUTION | RESOLUTION | TONE | HIGH-RESOLUTION | RESOLUTION | TONE |
| 600 | TONE | TONE | TONE | TONE | O | O | X | N | N | Y | N | N | N |
| 600 | STANDARD | HIGH-RESOLUTION | TONE | TONE | O | X | X | Y | N | N | N | N | N |
| 1200 | PATTERN 7 | HIGH-RESOLUTION | RESOLUTION | TONE | O | O | O | N | N | N | Y | Y | Y |
| 1200 | PATTERN 7 | HIGH-RESOLUTION | RESOLUTION | TONE | O | X | O | N | N | N | Y | N | Y |
| 1200 | PATTERN 7 | HIGH-RESOLUTION | RESOLUTION | TONE | X | X | O | N | N | N | N | N | Y |

FIG.17

| 1 | 5 | 17 | 33 | 2 | 6 | 18 | 34 |
|---|---|----|----|---|---|----|----|
| 13 | 9 | 25 | 41 | 14 | 10 | 26 | 42 |
| 21 | 29 | 45 | 49 | 22 | 30 | 46 | 50 |
| 37 | 53 | 57 | 61 | 38 | 54 | 58 | 62 |
| 4 | 8 | 20 | 36 | 3 | 7 | 19 | 35 |
| 16 | 12 | 28 | 44 | 15 | 11 | 27 | 43 |
| 24 | 32 | 48 | 52 | 23 | 31 | 47 | 51 |
| 40 | 56 | 60 | 64 | 39 | 55 | 59 | 63 |

FIG.23

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method implemented in a printer that prints after tone-corrected data is spooled thereto, and whereby automatic tone correction is conducted during the print job.

2. Description of the Related Art

In recent years, most color printer models are equipped with automatic tone correction in order to provide consistent color reproduction. At the same time, the number of cases wherein consistent image quality is demanded even in monochrome binary printers is increasing, thus requiring automatic tone correction in order to provide consistent tone.

In addition, the number of printed pages in an office is not significantly large, and thus if automatic tone correction is conducted during a print job, the user is made to wait for printing. For this reason, it has been typical to not conduct automatic tone correction during print jobs. However, in POD (Print on Demand) environments wherein a printer is used like a printing press, the number of printed pages is extremely large, and the printer is used differently than in an office. In addition, since POD involves commercial printing wherein printed material is sold, the demands made with respect to image quality are becoming stricter. Given the above, there is a need to improve image quality consistency in POD environments by conducting automatic tone correction even during print jobs.

In automatic tone correction, it is necessary to conduct tone correction for all screens being used. The screen ruling for each halftone screen differs, and the binarized pattern dither matrix like that shown in FIG. 23 differs for each screen. Even if the same multi-valued data is binarized according to the dither matrix, the patterns and shapes colored black will differ, thereby causing the output tones to differ. For this reason, it is necessary to create tone correction lookup table for each screen.

In the case of output by means of copying, for example, error diffusion screens and tone screens for copying may be used as the screens. In the case of output by means of developing a PDL (Page Description Language) to output with high quality, PDL high-resolution screens, PDL low-resolution screens, or PDL tone screens become necessary. And in case of output by means of copying and the PDL with more than one resolutions, screen is necessary for each resolution.

Japanese Patent Laid-Open No. 2003-270868 discloses technology related to screens used in automatic tone correction, wherein information regarding a screen used in screening set in a print control unit is received. Subsequently, tone correction is conducted using a tone correction patch whereby an image was formed with the screen used in the screening, thereby making it possible to improve tone correction precision.

Japanese Patent Laid-Open No. 2005-111714 discloses technology related to saving and deleting bitmap data, wherein saved bitmap data is deleted when the number of times the bitmap data is used is low, thereby making effective use of storage space.

However, in automatic tone correction, it is necessary to create tone correction lookup table for all of a large number of screens used, and thus automatic tone correction processing has been time-consuming.

SUMMARY OF THE INVENTION

In order to solve the above problem, an image processing apparatus in accordance with an embodiment of the present invention includes the following: printing unit for conducting tone correction for bitmap data of a print job, and then printing the tone-corrected bitmap data; automatic tone correcting unit for conducting automatic tone correction while the printing unit is processing the print job; and configuring unit for configuring an image quality mode for printing by the printing unit. The automatic tone correction conducted by the automatic tone correcting unit while the print job is being processed may not be conducted, depending on the image quality mode configured by the configuring unit.

According to an embodiment of the present invention, the automatic tone correction processing time can be shortened.

Further features of the present invention will become apparent from the following description of exemplary embodiments (with reference to the attached drawings).

BRIEF DESCRIPTION OF THE DRAWINGS

FIG. 15 illustrates a processing selection chart;

FIG. 17 illustrates a processing selection chart;

FIG. 23 illustrates an example of a dither matrix.

DESCRIPTION OF THE EMBODIMENTS (Embodiment 1)

First, automatic tone correction processing in a monochrome binary printer will be described using FIGS. 1 to 3 as an example of automatic tone correction. In the automatic tone correction processing to be hereinafter described, data processing is conducted on the basis of a PDL (Page Description Language) by way of example.

Figure 1:
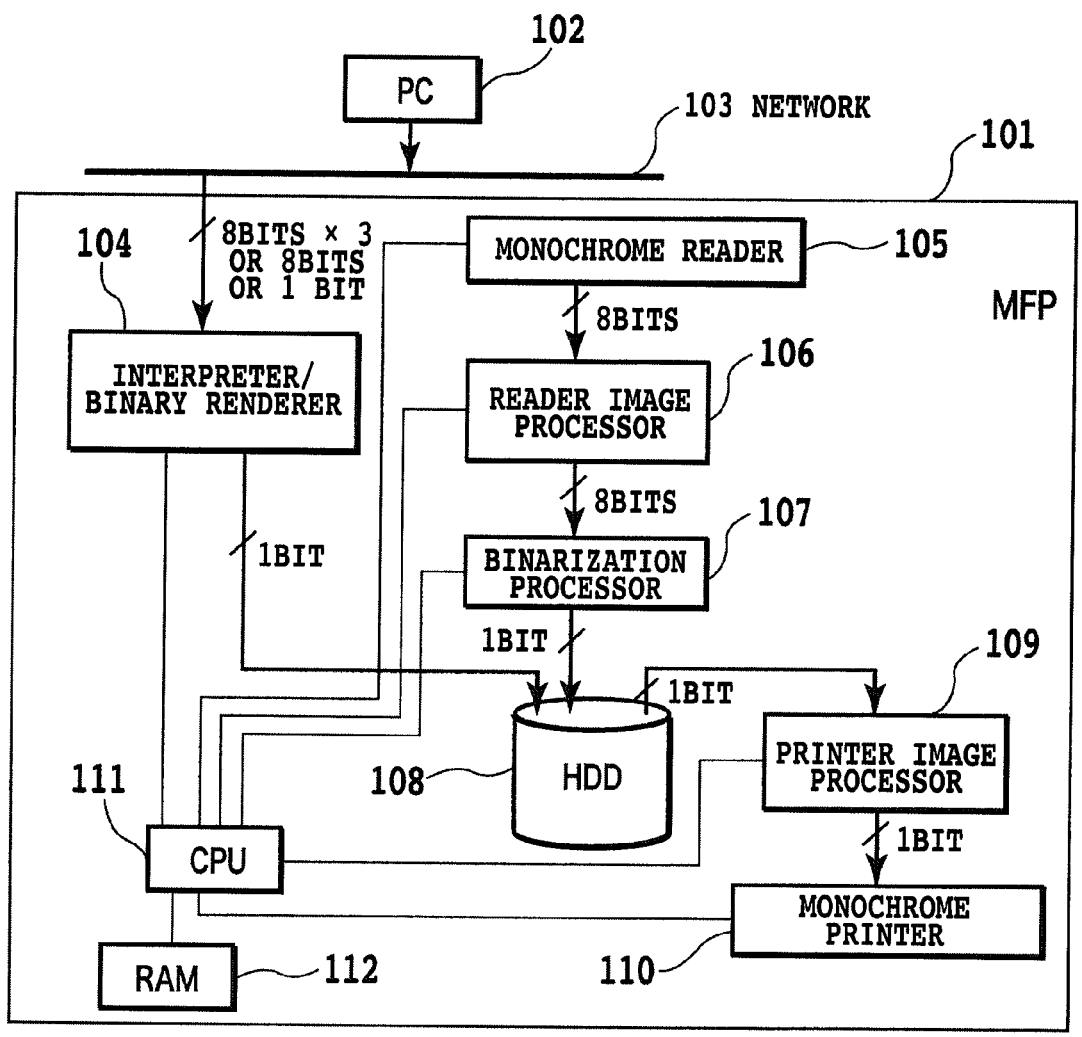
FIG. 1 is a block diagram of an embodiment of the present invention.

FIG. 1 illustrates a block diagram for explaining processing in accordance with the present embodiment. In FIG. 1, a PC 102 is connected to the interpreter/binary renderer 104 of an MFP 101 via a network 103. In addition, the interpreter/binary renderer 104 is connected to a CPU 111. The CPU 111 is connected to RAM 112, a monochrome reader 105, a reader image processor 106, a binarization processor 107, a printer image processor 109, and a monochrome printer 110. In addition, the interpreter/binary renderer 104, the binarization processor 107, and the printer image processor 109 are connected to an HDD 108. In addition, the monochrome reader 105 is connected to the reader image processor 106, and the reader image processor 106 is connected to the binarization processor 107.

Figure 2:
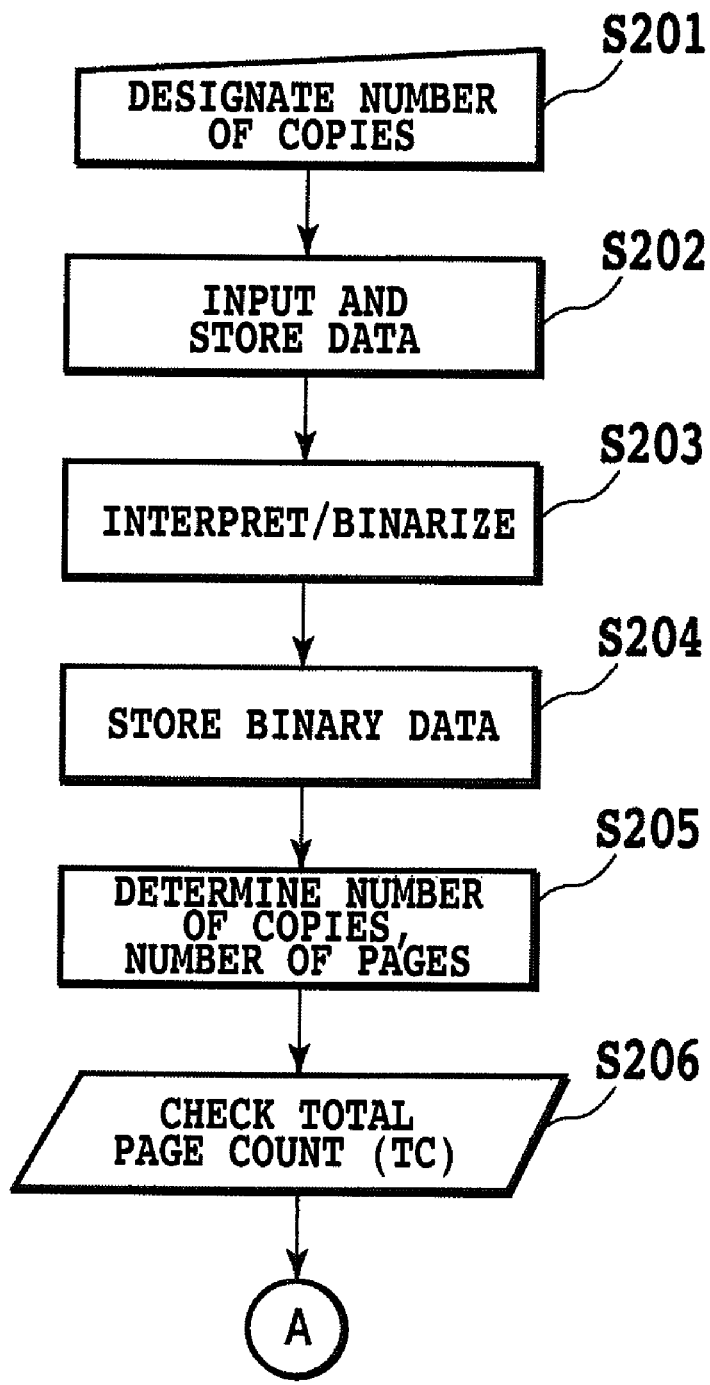
FIG. 2 is a flowchart in accordance with an example of the related art.

First, in step S201 of FIG. 2, instructions are issued to an MFP to print A copies of a document. The instructions herein are issued from the UI (User Interface) of the PC (Personal Computer) 102 shown in FIG. 1.

Next, in step S202, PDL data is input into the MFP (Multi Function Printer) 101 via the network 103 shown in FIG. 1. The input PDL data is then stored in the RAM 112 or the HDD 108 as a result of control by the CPU 111.

Next, in step S203, the PDL data stored in the RAM 112 or the HDD 108 is passed to the interpreter/binary renderer 104, where the PDL data is interpreted to obtain image data, which is then successively tone-corrected and binarized.

Next, in step S204, the binarized bitmap data from step S203 is stored in the RAM 112 or the HDD 108.

Next, in step S205, it is determined from the bitmap data obtained in step S204 how many pages of data are to be printed, as well as how many copies of the data are to be printed. In the present example, A copies of the data are printed and a set of B pages per each data are to be printed.

Next, in step S206, the total page count (TC) of pages printed for period of time from previous automatic tone correction up to this point is acquired and checked in order to control the timings when automatic tone correction is conducted during the job before printing is actually initiated. The total page count (TC) is acquired because the print density (i.e., contrast) of the printer gradually changes as the total page count increases. When such change occurs, it is necessary to conduct tone correction each time a certain number of pages are printed, in order to make the density consistent.

Subsequently, the process proceeds to the processing process A shown in FIG. 3, and actual print commences.

Figure 3:
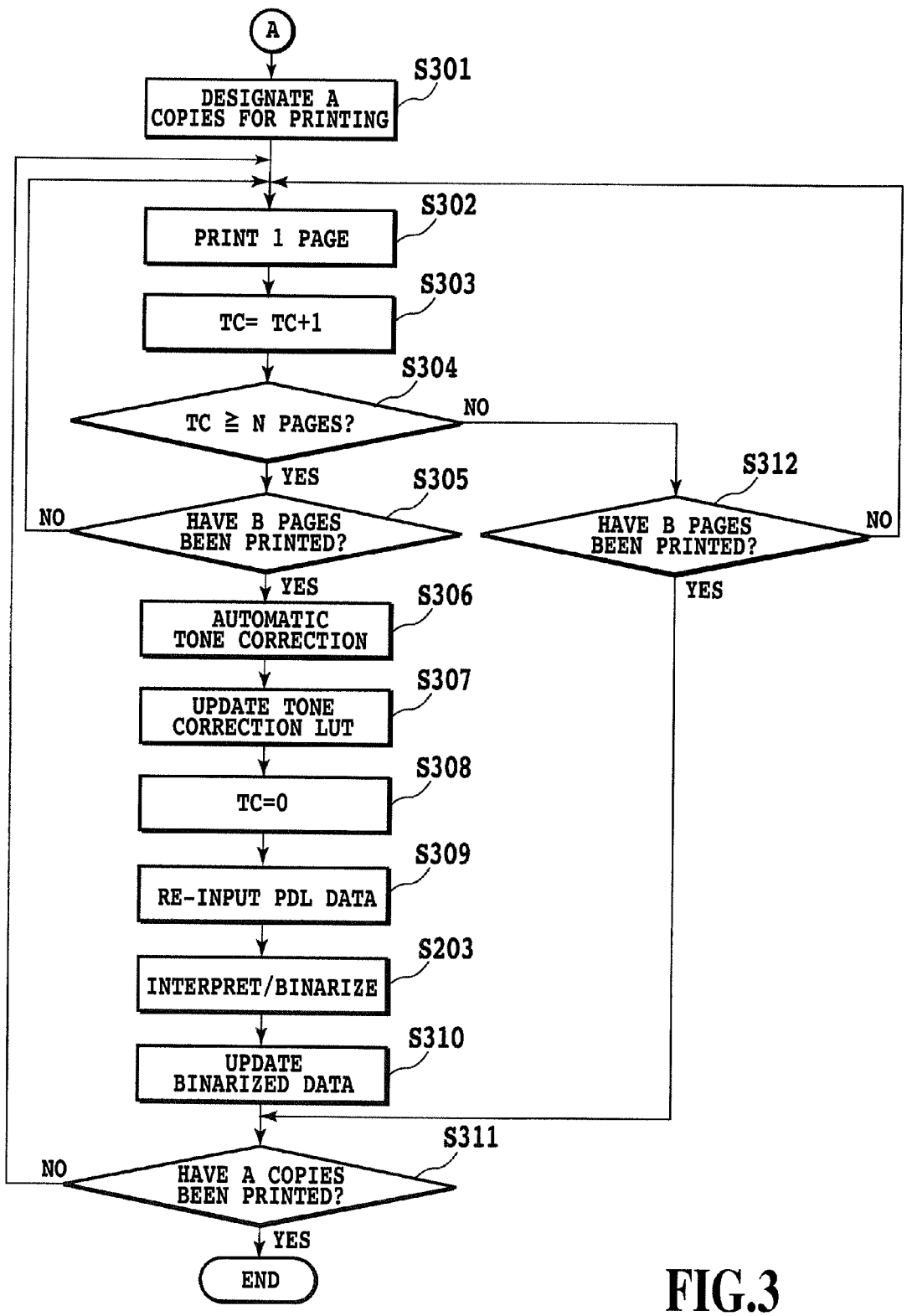
FIG. 3 is a flowchart in accordance with an example of the related art.

By way of example, in the process A shown in FIG. 3, automatic tone correction is conducted during the print job every time the printing of a fixed number pages constituting one copy is completed. In this processing, automatic tone correction is not conducted during the printing of the pages constituting one copy within the print job, thereby enabling the print tone and density to be made uniform among the pages constituting one copy.

The processing shown in FIG. 3 and hereinafter described may be entirely executed by the CPU 111, for example.

First, in step S301, print job instructions for printing A copies are issued.

Next, in step S302, printing of the pages constituting one copy is conducted one page at a time, in order. When printing is being conducted, binarized bitmap data is retrieved from the HDD 108 or the RAM 112 shown in FIG. 1 as a result of control by the CPU 111. The retrieved bitmap data is then subjected to required processes such as text edge smoothing by the printer image processor 109, and then sent to the printer 110 and printed.

Next, in step S303, the total page count TC is incremented by 1.

Next, in step S304, it is determined whether or not TC equals or exceeds a prescribed page count N. The prescribed page count N may, for example, be set to a number such that automatic tone correction is necessary after the printing a number of pages equal to the stipulated page count N has been completed. For example, in step S304, it is determined whether or not TC equals or exceeds a stipulated page count N=5000.

If it is determined in step S304 that TC does not equal or exceed N, then the process proceeds to step S312.

If it is determined in step S304 that TC does equal or exceed N, then the process proceeds to step S305.

In step S312, it is determined whether or not the printing of B pages (i.e., the total number of pages in one of the copies designated by the instructions in step S301) has been completed.

If it is determined in step S312 that the printing of B pages has not been completed, then the process proceeds to step S302.

If it is determined in step S312 that the printing of B pages has been completed, then the process proceeds to step S311.

In step S305, it is likewise determined whether or not the printing of B pages (i.e., the total number of pages in one of the copies designated by the instructions in step S301) has been completed.

If it is determined in step S305 that the printing of B pages has not been completed, then the process proceeds to step S302.

If it is determined in step S305 that the printing of B pages has been completed, then the process proceeds to step S306.

Next, in step S306, automatic tone correction is conducted.

Next, in step S307, a tone correction lookup table (LUT) is corrected and updated in accordance with the results of the automatic tone correction in step S306.

Figure 18:
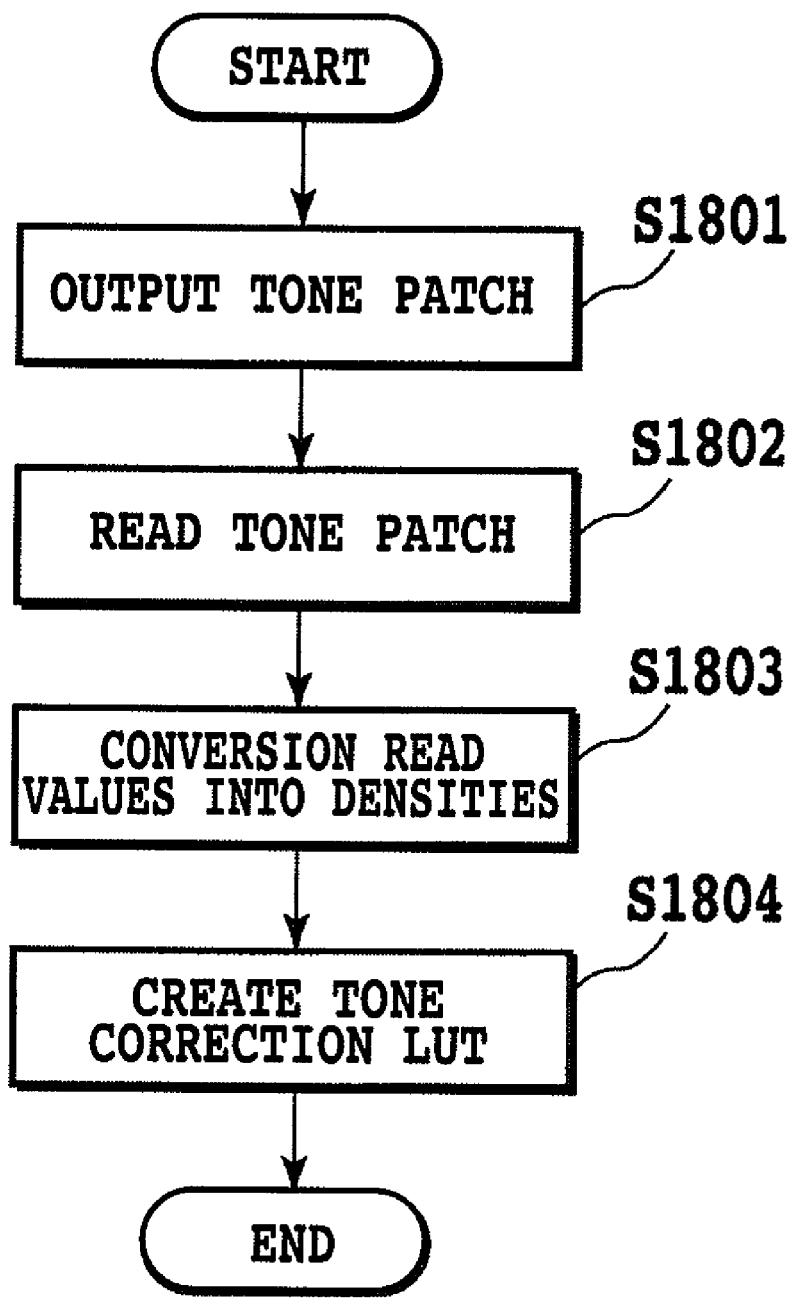
FIG. 18 is a flowchart for automatic tone correction.

Automatic tone correction will now be described using FIG. 18.

The processing shown in FIG. 18 and hereinafter described may be entirely executed by the CPU 111, for example.

First, in step S1801, a tone patch image used in automatic tone correction is output to a transfer belt or similar internal printer component. For example, a tone patch image like that shown in FIG. 19 may be output.

Next, in step S1802, the tone patch image is scanned by a sensor inside the printer.

Figure 21:
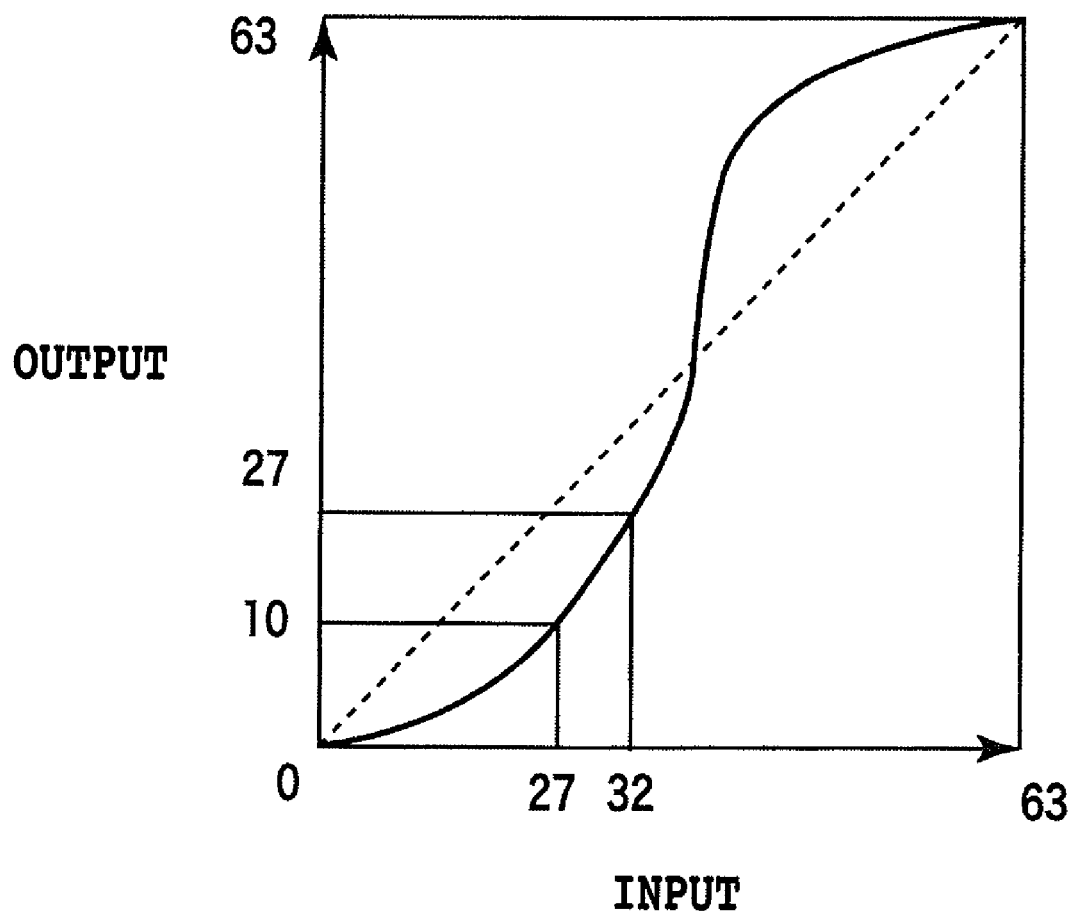
FIG. 21 illustrates printer engine characteristics.

Next, in step S1803, the brightness signal obtained by scanning the tone patch image is converted into densities. The densities converted in step S1803 are then plotted as shown in FIG. 21 to obtain a characteristic curve of output with respect to input.

Figure 20:
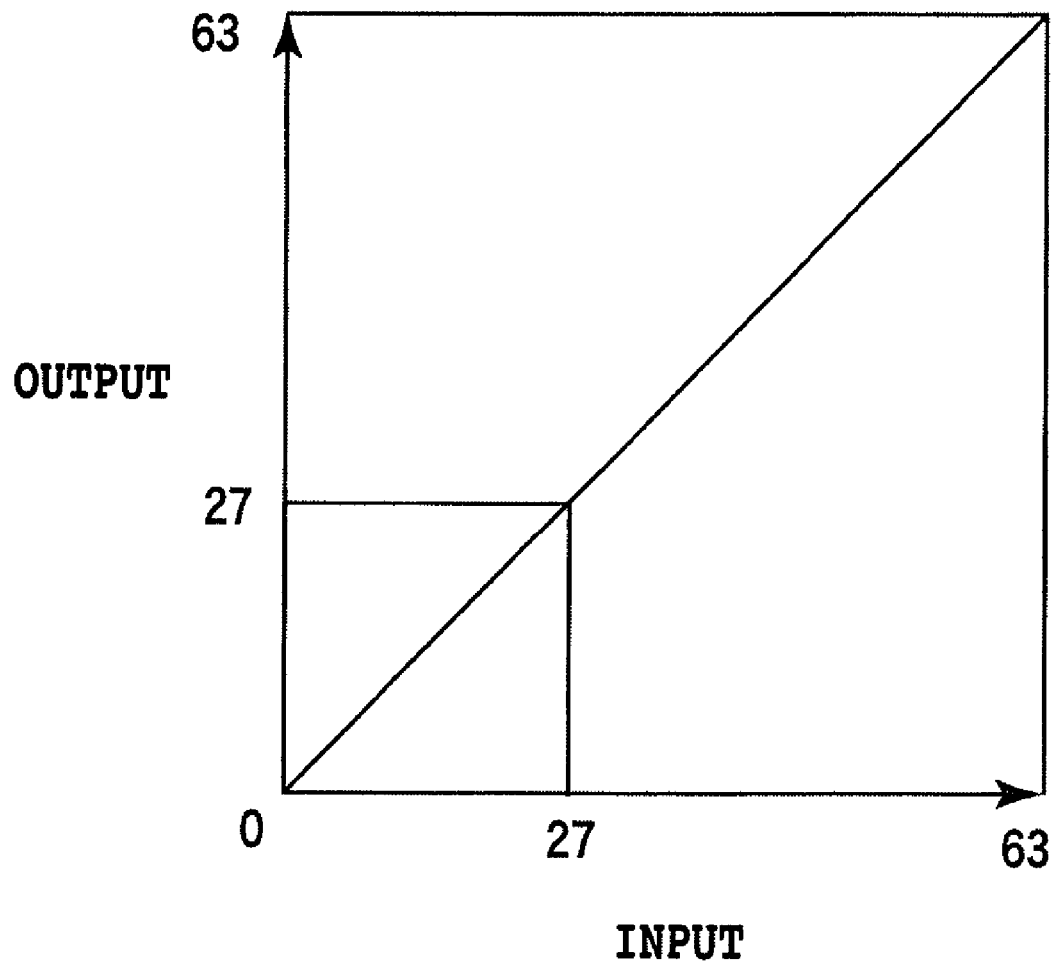
FIG. 20 illustrates printer target tones.
Figure 22:
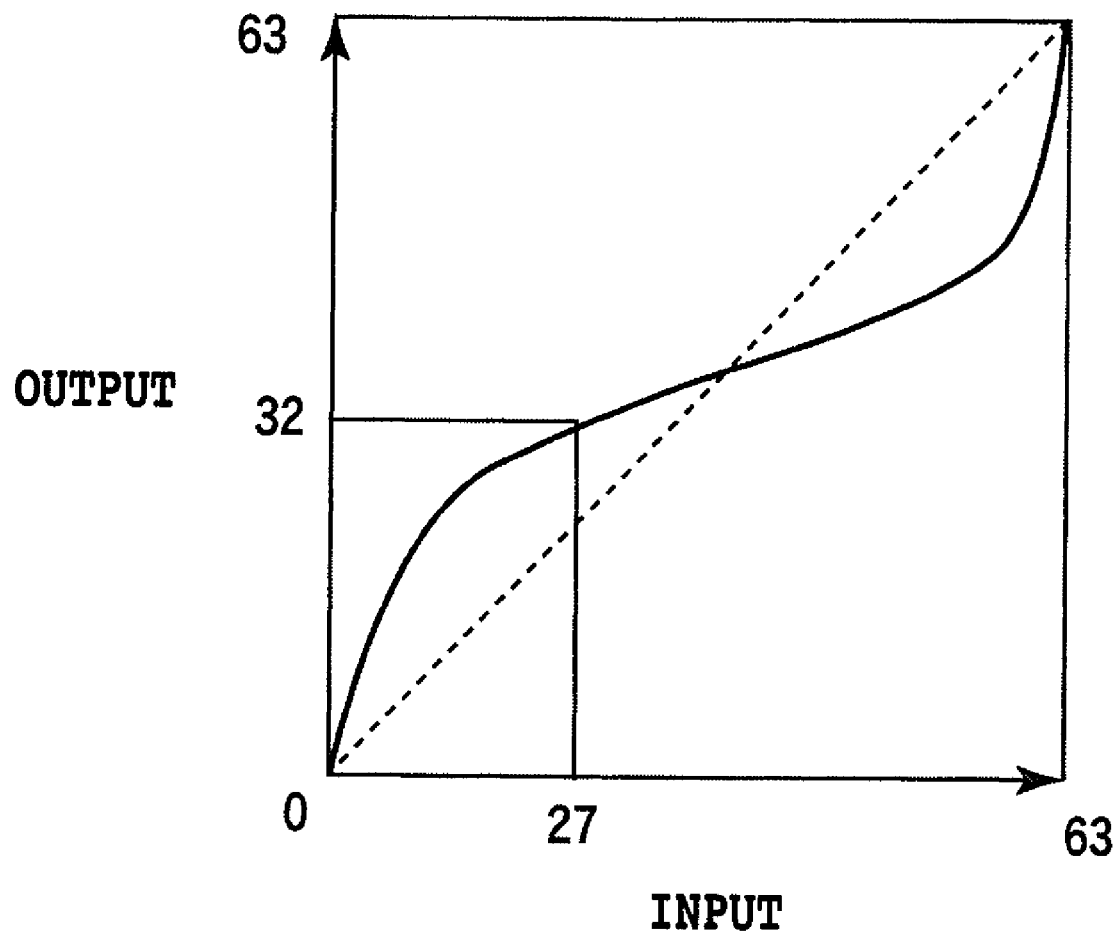
FIG. 22 illustrates a tone correction lookup table (LUT)

Next, in step S1804, a tone correction lookup table (LUT) like that shown in FIG. 22 is created in order to make the characteristic curve become an ideal characteristic curve of output with respect to input like that shown in FIG. 20.

Next, in step S308 of FIG. 3, the total page count TC is cleared by setting TC=0.

Next, in step S309, the original PDL data to be printed is again retrieved from the RAM 112 or the HDD 108 and input into the MFP 101 in order to apply the tone correction to the PDL data.

Next, similarly to step S203, the PDL data retrieved in step S309 is again PDL-interpreted, and the obtained image data is then tone corrected using the tone correction lookup table that was updated by automatic tone correction. The tone corrected image data is then binarized to create bitmap data as a result.

Next, the bitmap data which is created in step S310 is stored as new, re-corrected tone corrected data, substituting and updating the binarized data that was stored in the RAM 112 or the HDD 108 in step S204.

Next, in step S311, it is determined whether or not the printing of A copies (i.e., all copies) has completed.

If it is determined in step S311 that the printing of A copies has completed, then the process is terminated.

If it is determined in step S311 that the printing of A copies has not been completed, then the process proceeds to step S302.

Figure 19:
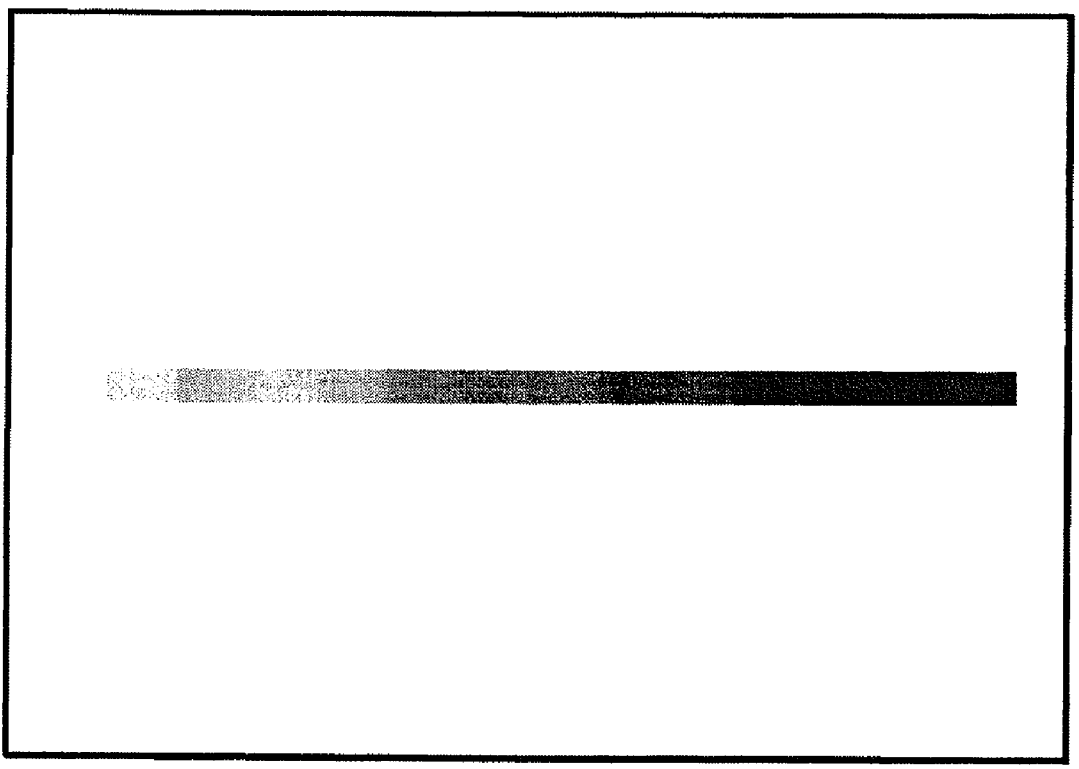
FIG. 19 illustrates an example of a tone patch.

In the automatic tone correction process described above, it is necessary to create tone patch image shown in FIG. 19 and conduct tone correction for each of the large number of screens used to output data, and thus the automatic tone correction processing time will be length.

For example, for copy output, two screens become necessary: an error diffusion screen and a copy tone screen. In addition, for PDL output, three screens having the required resolution become necessary: a PDL high-resolution screen, a PDL resolution screen, and a PDL tone screen.

For PDL output, there may also exist two modes for providing different output speeds and image qualities, such as a 600 dpi mode and a 1200 dpi mode, for example. In such a case, tone correction becomes required for 8 screens (2+3×2) when combined with the copy output case. For this reason, if automatic tone correction is conducted over all of the above screens, then the automatic tone correction processing time will be very lengthy.

Hereinafter, a first embodiment of the present invention that is able to shorten automatic tone correction processing time will be described using FIGS. 4 and 7.

The processes illustrated in FIGS. 4 and 7 and hereinafter described may be entirely executed by the CPU 111, for example.

Figure 4:
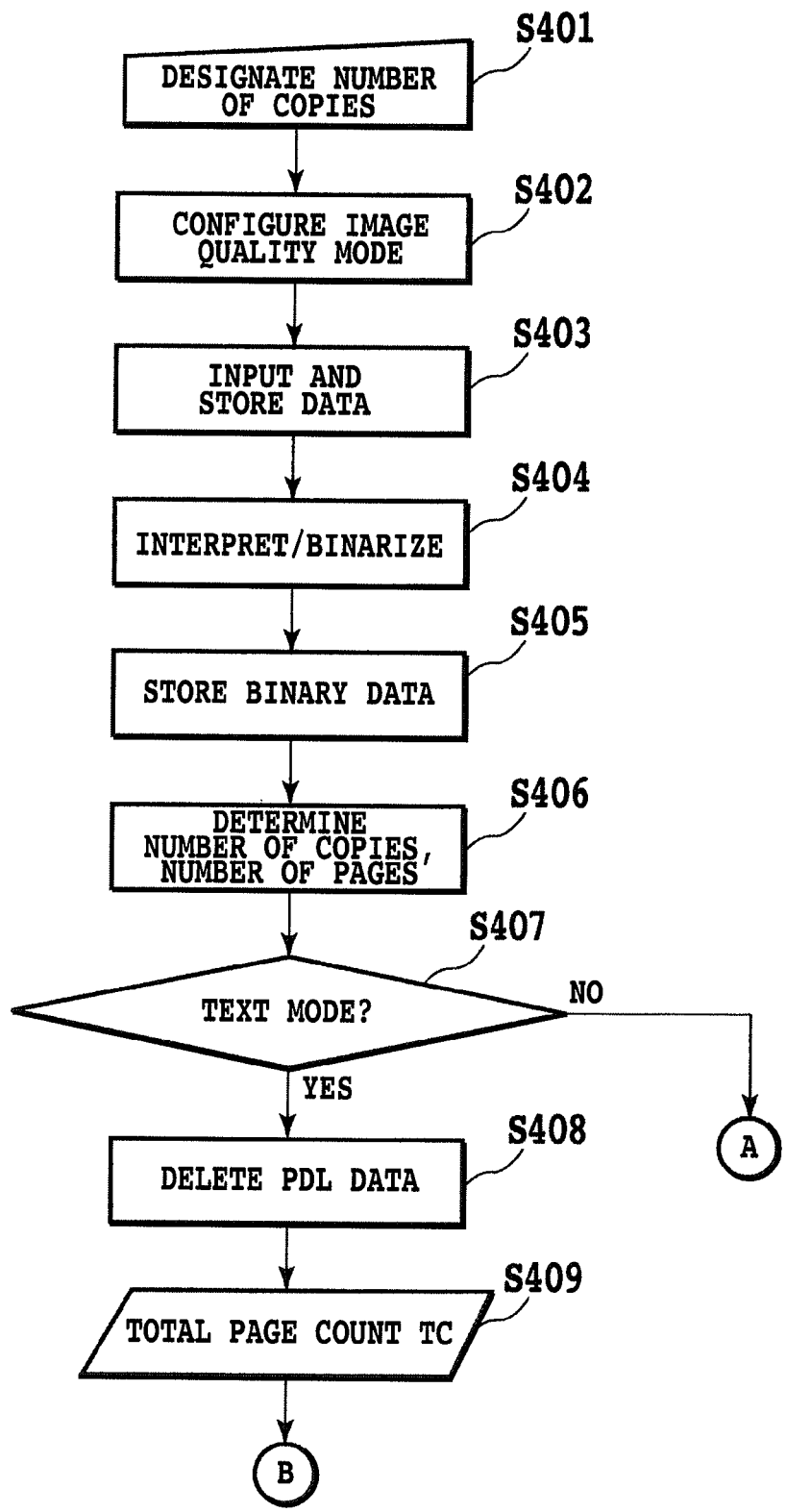
FIG. 4 is a flowchart in accordance with an embodiment of the present invention.

First, in step S401 of FIG. 4, instructions for the printing of A copies by the PC (Personal Computer) 102 shown in FIG. 1 are received from the UI (User Interface) of the PC 102.

The UI of the PC 102 may also include functions enabling configuration of an image quality mode that designates the output image quality of the images to be output. Furthermore, a text mode and a photograph mode may be provided as image quality modes.

Herein, text mode is a mode wherein the images to be output are processed for text. In addition, photograph mode is a mode wherein the images to be output are processed for photographs.

Figure 5:
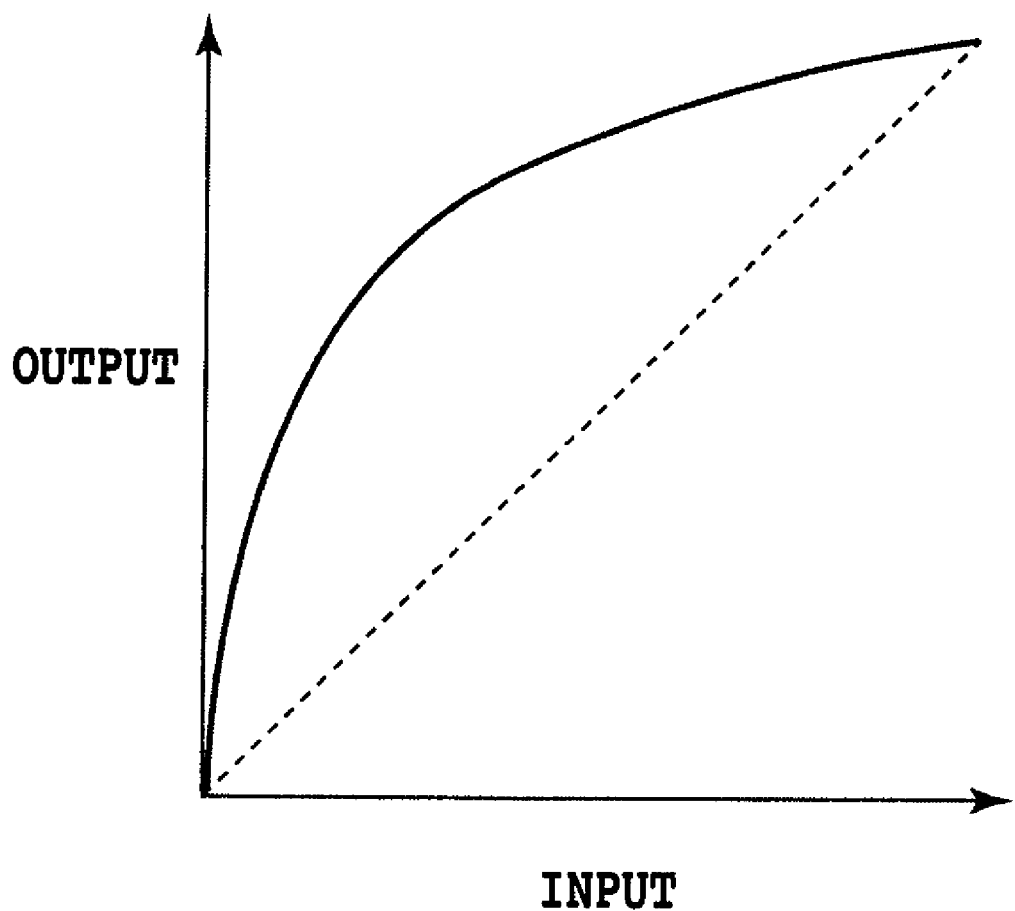
FIG. 5 illustrates tone characteristics in text mode.

In addition, if text mode is designated, then output tones may be configured with respect to input tones such that even light portions are output densely as shown in FIG. 5, thereby making even light text distinct.

Figure 6:
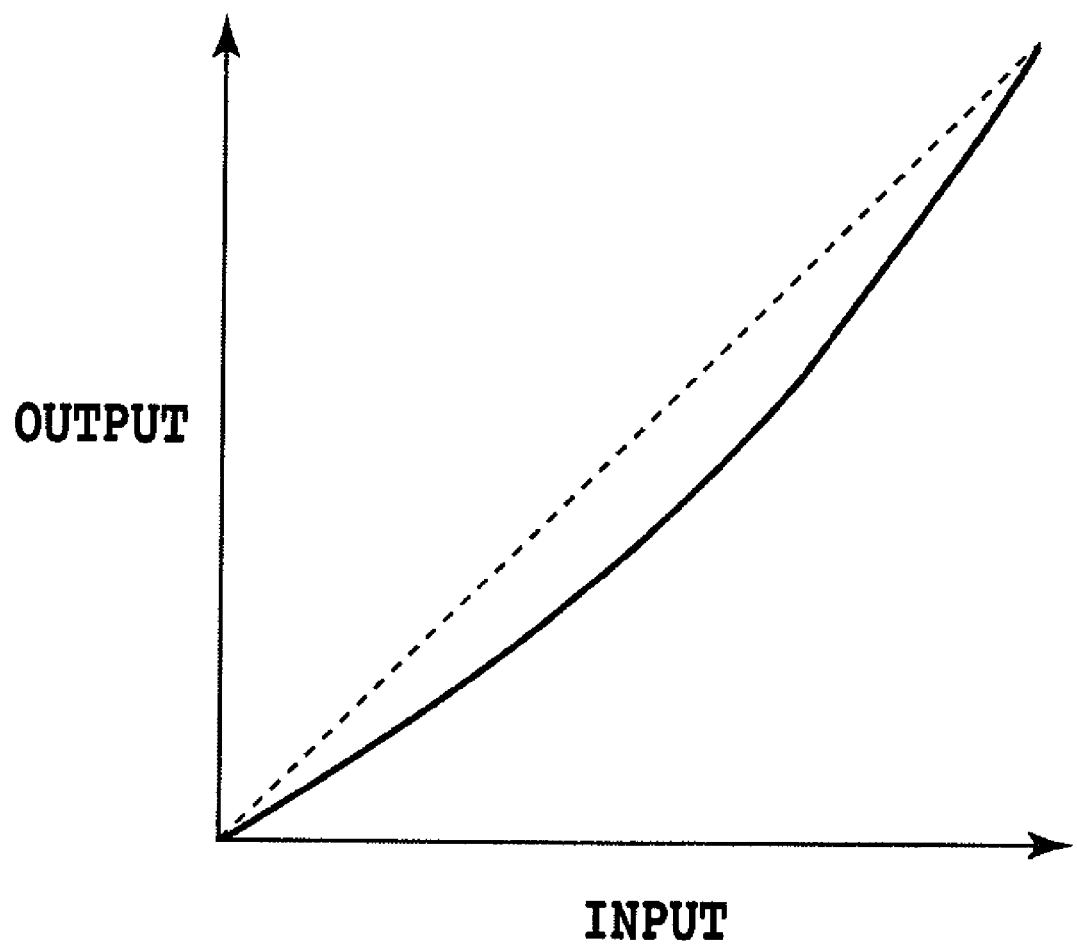
FIG. 6 illustrates tone characteristics in photograph mode.

In addition, if photograph mode is designated, then a flatter tone characteristics than that shown in FIG. 5 like that shown in FIG. 6 may be configured in order to emphasize photographic tones.

Next, in step S402, an image quality mode like the above is designated.

Next, in step S403, data related to the mode designated in step S402 is input, together with the PDL data, into the MFP (Multi-Function Printer) 101 shown in FIG. 1, and then stored in the RAM 112 or the HDD 108.

Next, in step S404, the stored data is successively PDL-interpreted by the interpreter/binary renderer 104 shown in FIG. 1 to obtain multi-valued image data and the tone correction shown in FIG. 5 and FIG. 6 is performed for the multi-valued image data according to the image quality mode. After that, a tone correction according to stored tone correction lookup table and binarization (i.e., bitmapping) are performed.

Next, in step S405, the data that was bitmapped in step S404 (i.e., the bitmap data) is stored in the RAM 112 or the HDD 108.

Next, in step S406, it is determined from the bitmap data obtained in step S405 how many pages of data are to be printed, as well as how many copies of the data are to be printed. In the present example, A copies of the data are printed and a set of B pages per each data are to be printed.

Next, in step S407, it is determined whether or not the image quality mode is in text mode.

If it is determined in step S407 that the image quality mode is in text mode, then the process proceeds to step S408.

If it is determined in step S407 that the image quality mode is not in text mode, then the processing A shown in FIG. 3 is executed. In this case, processing similar to that of the related art is executed.

If it is determined that the image quality mode is in text mode, in step S408, the PDL data that was stored in step S403 is deleted, thereby freeing up resources in the RAM 112 or the HDD 108. The above is performed because, if the image quality mode is in text mode and thus tone characteristics for making text distinct like those shown in FIG. 5 have been set, for example, then the effects of tone correction are slight, even if automatic tone correction is conducted during the print job. In this way, automatic tone correction is omitted in the present embodiment for image quality modes where the effects of tone correction are slight, thereby shortening processing time.

Next, in step S409, the total page count (TC) of pages printed up to step S409 is acquired. The total page count (TC) is used in the processing B shown in FIG. 7 and hereinafter described in order to determine whether or not to conduct automatic tone correction after outputting a required number of copies.

Figure 7:
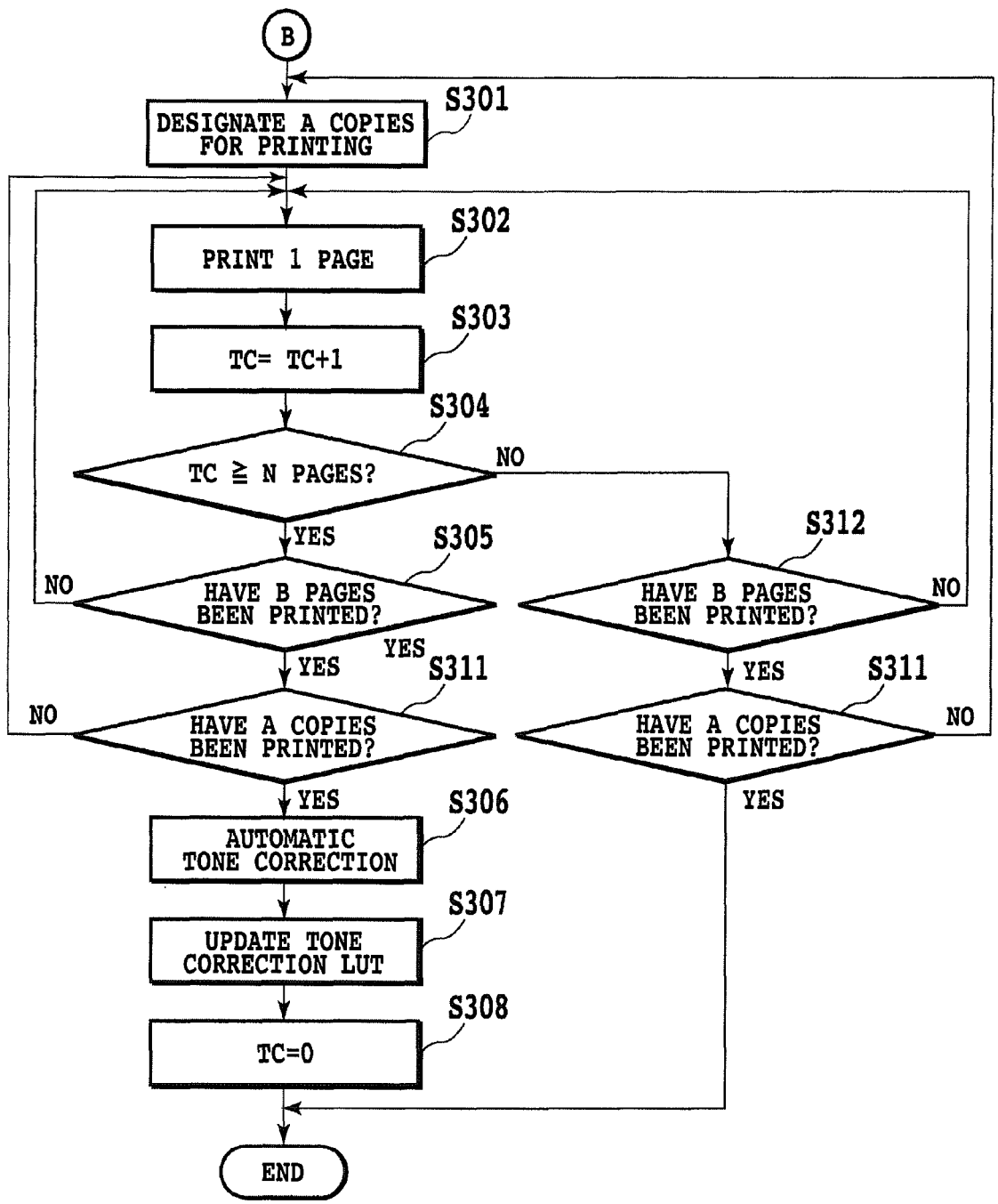
FIG. 7 is a flowchart in accordance with an embodiment of the present invention.

After step S409, the processing B shown in FIG. 7 is executed.

Compared to the processing shown in FIG. 3 that has been conventionally conducted, the processing in steps S306 to S308 in FIG. 7 are only executed after the printing of all A copies has been completed. Thus, compared to the related art, automatic tone correction processing conducted mid-printing is configured to be omitted. In so doing, the processing time for automatic tone correction is shortened, and the amount of time the user waits until print output is completed is shortened.

In addition, by conducting automatic tone correction after the printing of all A copies has been completed, it becomes possible to set the device to be a state which can realizes the tone correction required for the next submitted job.

In the foregoing embodiment, it is determined in step S407 of FIG. 4 whether or not the image quality mode is in text mode. If the image quality mode is in text mode, then the processing time for A copies of the data is shortened because the automatic tone correction is not performed during A copies of the data are printed. Although the image quality mode is in text mode in the foregoing embodiment, if the image quality mode is in a mode wherein output tones will be little affected with respect to input modes even if automatic tone correction is performed (i.e., CAD (Computer Aided Design) mode, graphic mode), then the automatic tone correction may be performed similarly to the case wherein the image quality mode is in text mode.

(Embodiment 2)

A second embodiment of the present invention will now be described using FIGS. 8 and 9.

The processing shown in FIGS. 8 and 9 and hereinafter described may be entirely executed by the CPU 111, for example.

Figure 8:
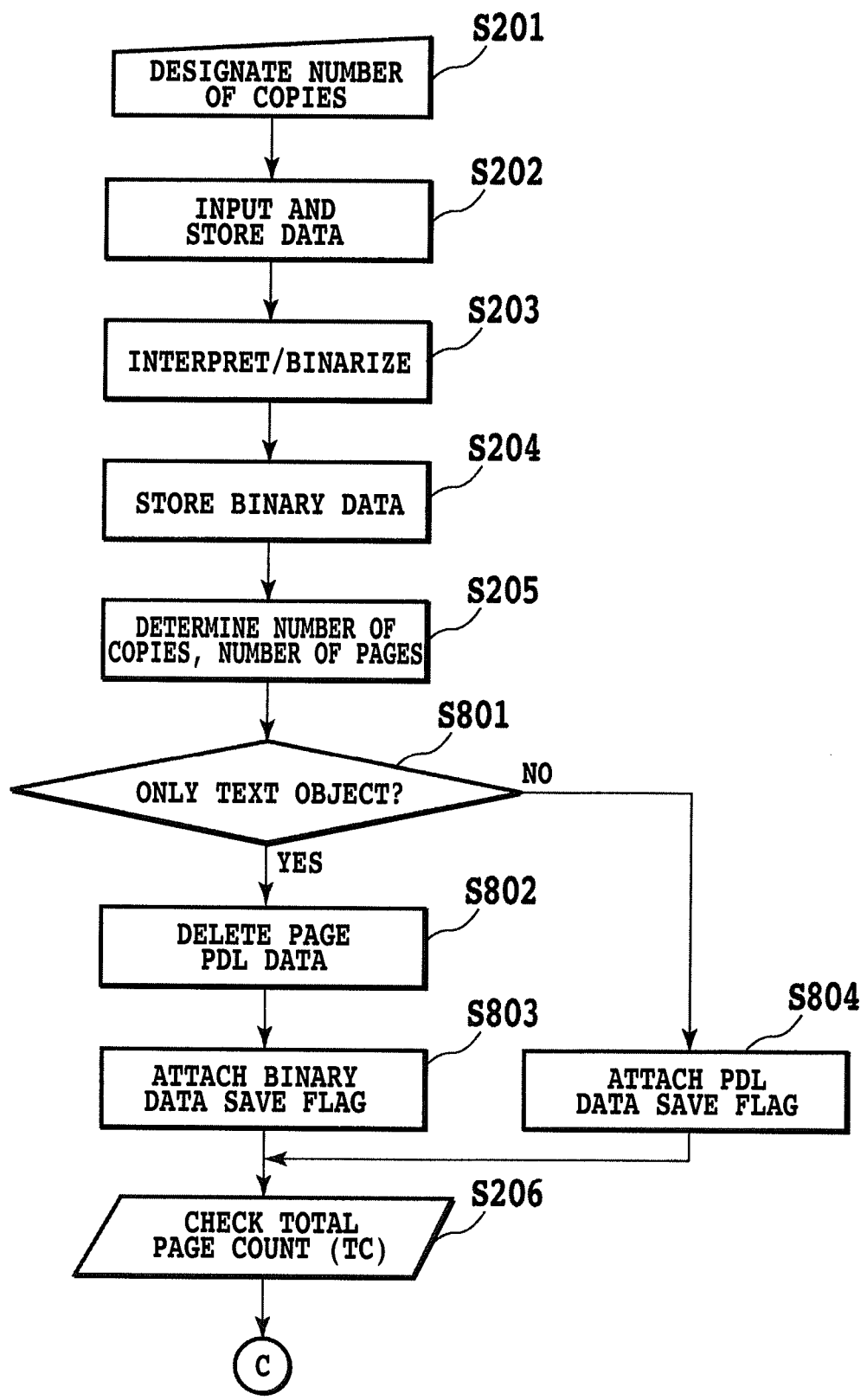
FIG. 8 is a flowchart in accordance with an embodiment of the present invention.

The processing in steps S201 to S205 and S206 shown in FIG. 8 are identical to the processing described using FIG. 2, and for this reason description thereof is omitted herein. Hereinafter, steps S801 to S804 will be described.

In step S801, it is determined what in-page objects exist in the PDL-interpreted portions constituting the print job when PDL-interpreted and binarized by the interpreter/binary renderer 104 shown in FIG. 1.

More specifically, the process proceeds to step S802 in the case where, for example, it is determined in step S801 that the in-page objects are all text objects.

In addition, if it is determined in step S801 that the in-page objects are not all text objects, for example, then the process proceeds to step S804.

Next, in step S802, the PDL data of pages including text objects are deleted.

Next, in step S803, a save flag is attached to the binary data. The attachment of a save flag in step S803 will be described later. The save flag attached in step S803 is used in the processing shown in FIG. 9 and hereinafter described.

Figure 9:
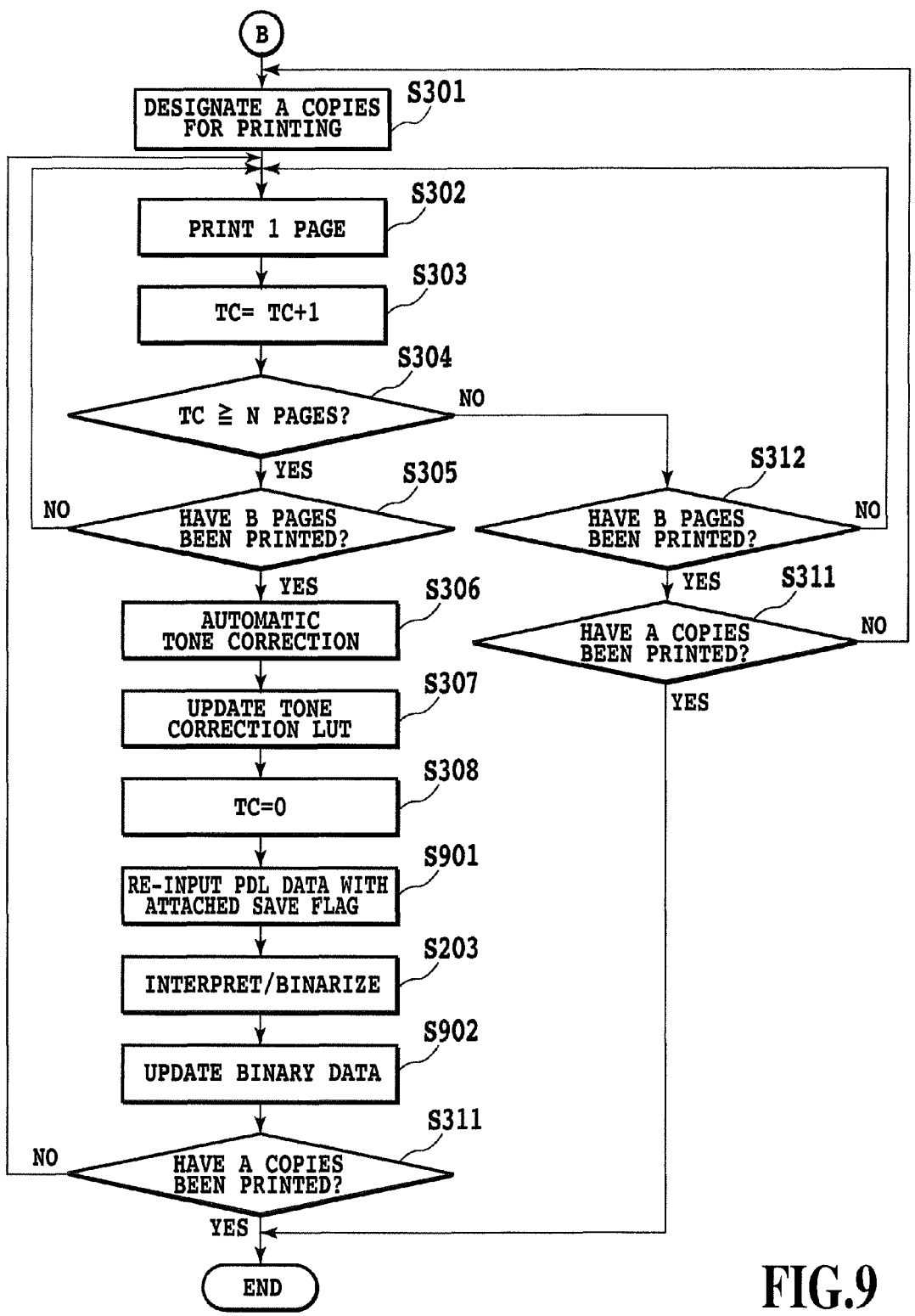
FIG. 9 is a flowchart in accordance with an embodiment of the present invention.

Next, after completing the processing in step S206, the processing C shown in FIG. 9 is executed.

If in-page objects are not all text objects, a save flag is attached to the PDL data in step S804. The attachment of a save flag in step S804 will be described later.

If page may includes not only binary data but also multi-valued data, it may also be determined whether or not a page contains only binarized data in step S801. The process may then be configured such that if NO is returned in step S801, then the process proceeds to step S804, and if YES is returned in step S801, then the process proceeds to step S802. In addition, in step S803, a save flag may be attached to the binary data corresponding to pages that only include binarized data in the binary data.

Figure 10:
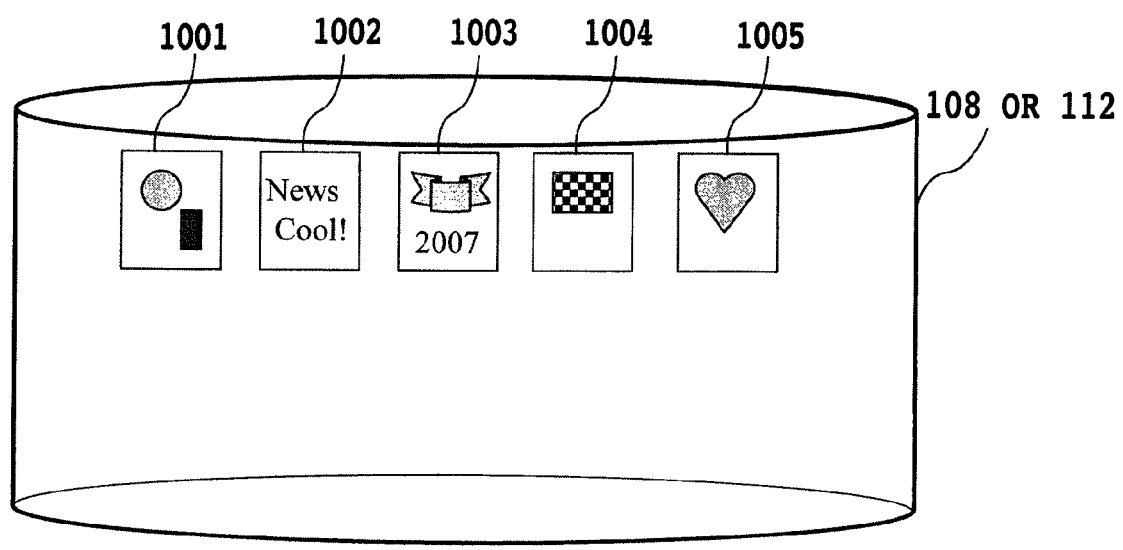
FIG. 10 illustrates how data is stored.
Figure 11:
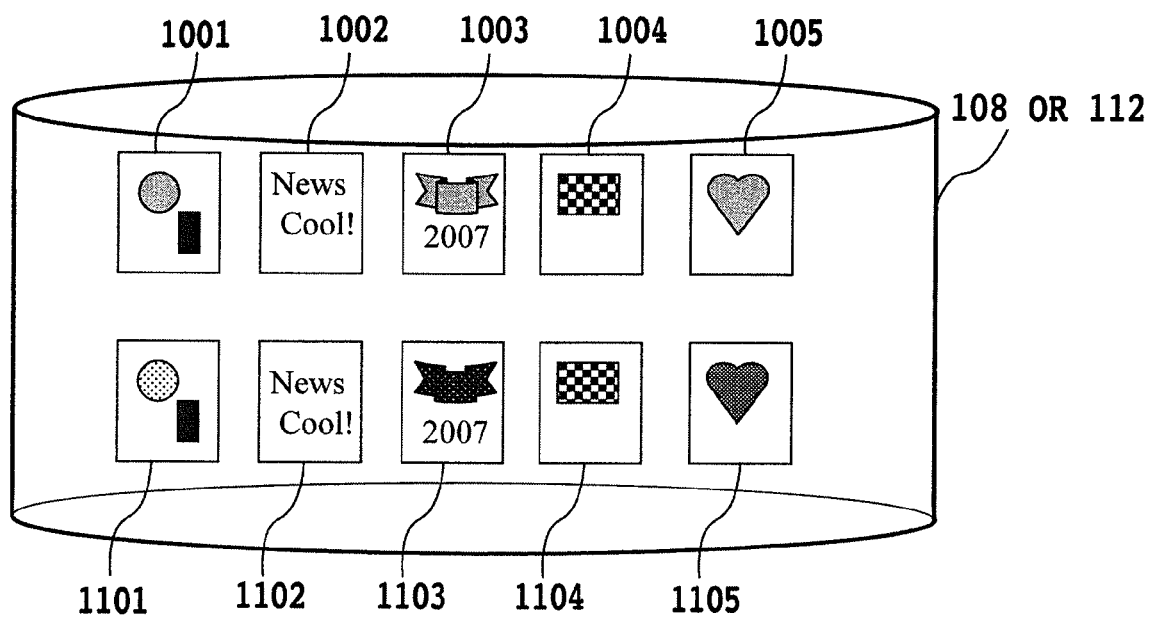
FIG. 11 illustrates how data is stored.

The state of the RAM 112 or the HDD 108 up to step S206 will now be described using FIGS. 10 and 11. By way of example, a print job having a total of five pages will be described. When PDL data is input in step S202 of FIG. 8, pages 1001 to 1005 like those shown in FIG. 10 are stored in the RAM 112 or the HDD 108. The PDL data of the pages 1001 to 1005 is interpreted and binarized in step S203 of FIG. 8, and then stored in the RAM 112 or the HDD 108 in step S204, thereby becoming like that shown in FIG. 11. FIG. 11 shows the binary data pages 1101 to 1105. In this way, in the related art, the state shown in FIG. 11 is continuously maintained, with all PDL data and binary data being stored.

In FIG. 10, page 1002 is a text-only page, while page 1004 is a page of binarized data. For this reason, the PDL data of page 1002 and page 1004 is deleted in step S802 of FIG. 8. In addition, in step S803 of FIG. 8, a Spool2 flag is attached to the binary data of page 1102, and a Spool4 flag is attached to the binary data of page 1104.

Figure 12:
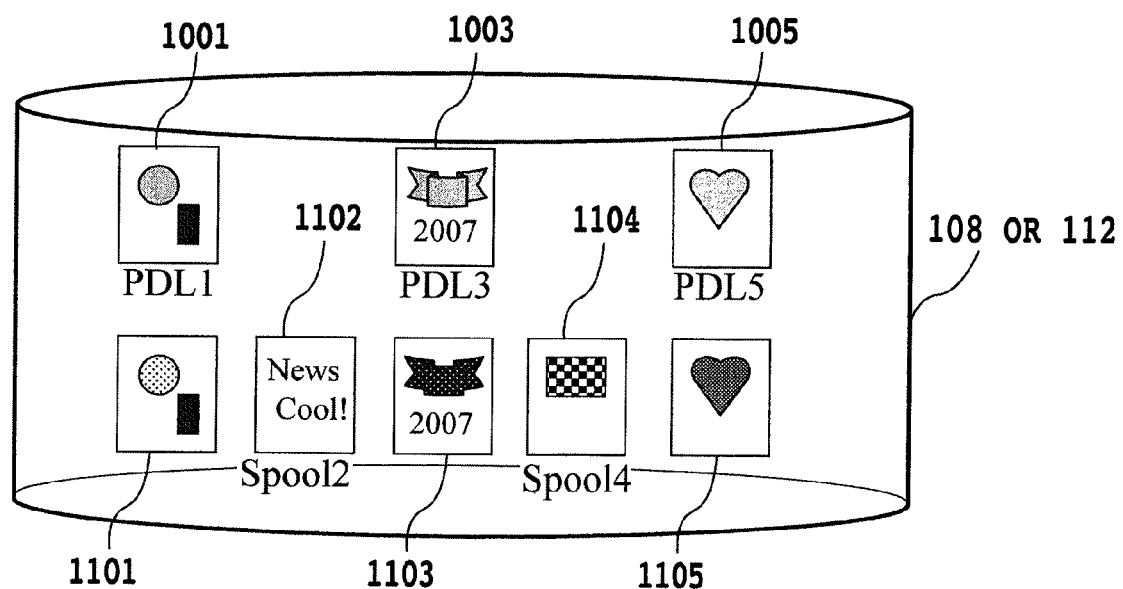
FIG. 12 illustrates how data is stored.

Next, in step S804 of FIG. 8, the PDL1, PDL3, and PDL5 flags are respectively attached to the PDL data pages 1001, 1003, and 1005 that are not all text or binarized data, thereby becoming like that shown in FIG. 12.

Hereinafter, the processing C will be described using FIG. 9.

The processing C in FIG. 9 is different from the processing A in FIG. 3 in that step S901 and step S902 have been added to the processing C. Hereinafter, step S901 and step S902 will be primarily described.

In step S901, the PDL data to which flags were attached in step S804 is re-input into the interpreter/binary renderer 104. The processing in step S901 is for re-generating, in the subsequent step S203 in FIG. 9, binary data for the pages that are not only text or binarized data.

Figure 13:
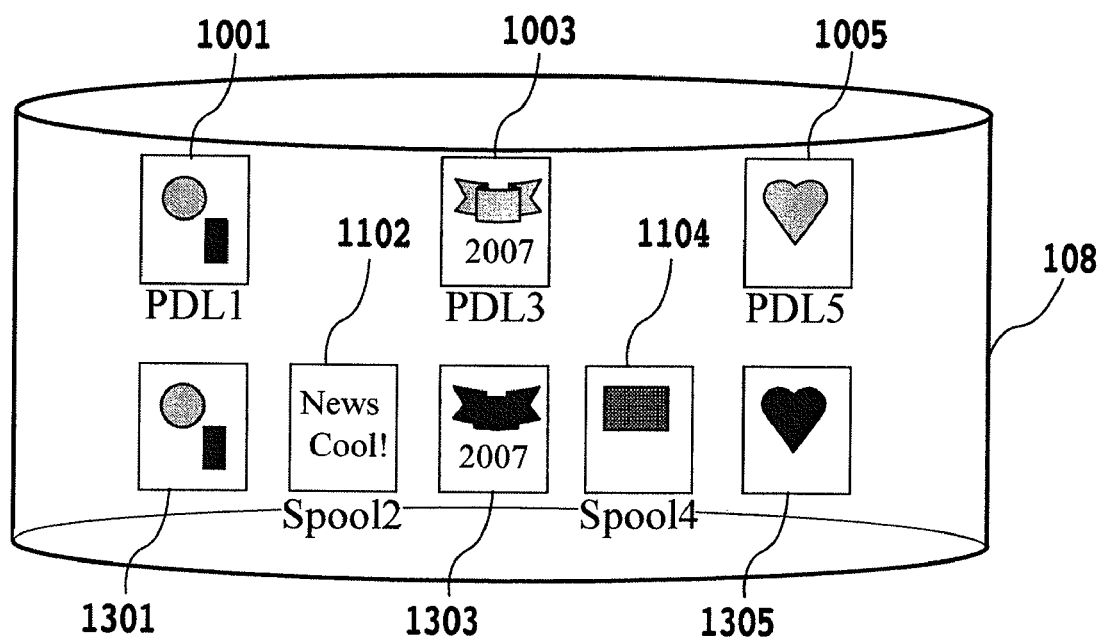
FIG. 13 illustrates how data is stored.

In step S902, the page order is reconstructed from the binary data that was re-generated in step S203 of FIG. 9 and the binary data that was saved in step S803 of FIG. 8, and then the above data is collected as a single set of data made up binary data. More specifically, the PDL data made up of the page 1001 having the attached flag PDL1, the page 1003 having the attached flag PDL3, and the page 1005 having the attached flag PDL5 shown in FIG. 12 is re-input. Subsequently, tone correction is performed using the lookup table that was tone-corrected during automatic tone correction, and then the data is re-binarized to generate page 1301, page 1303, and page 1305 shown in FIG. 13. A new print job is then re-generated from the above re-generated binary data and the already binarized data of page 1102 and 1104 having attached binary flags. Using the new, re-generated print job, the data for page 1301, page 1102, page 1303, page 1104, and page 1305 is printed. In so doing, the data to be re-binarized is reduced, thereby enabling the PDL interpretation and binarization processing times to be shortened.

According to the foregoing embodiment, automatic tone correction is not applied during print jobs for pages with only text or binarized data, for example, since the application of automatic tone correction to such pages produces little to no effect in terms of image quality. In addition, the PDL data is deleted for pages where the application of automatic tone correction is not required, and binarized data is managed on a per-page basis. Furthermore, since the application of automatic tone correction is required for pages containing more than just text or binarized data, for example, the PDL data for such pages is saved and managed on a per-page basis. In so doing, it becomes possible to retain the minimum amount of data for required pages only, while also minimize processing for the application of automatic tone correction, thereby minimizing the processing time for automatic tone correction and enabling the precise amount of automatic tone correction to be conducted.

(Embodiment 3)

Figure 14:
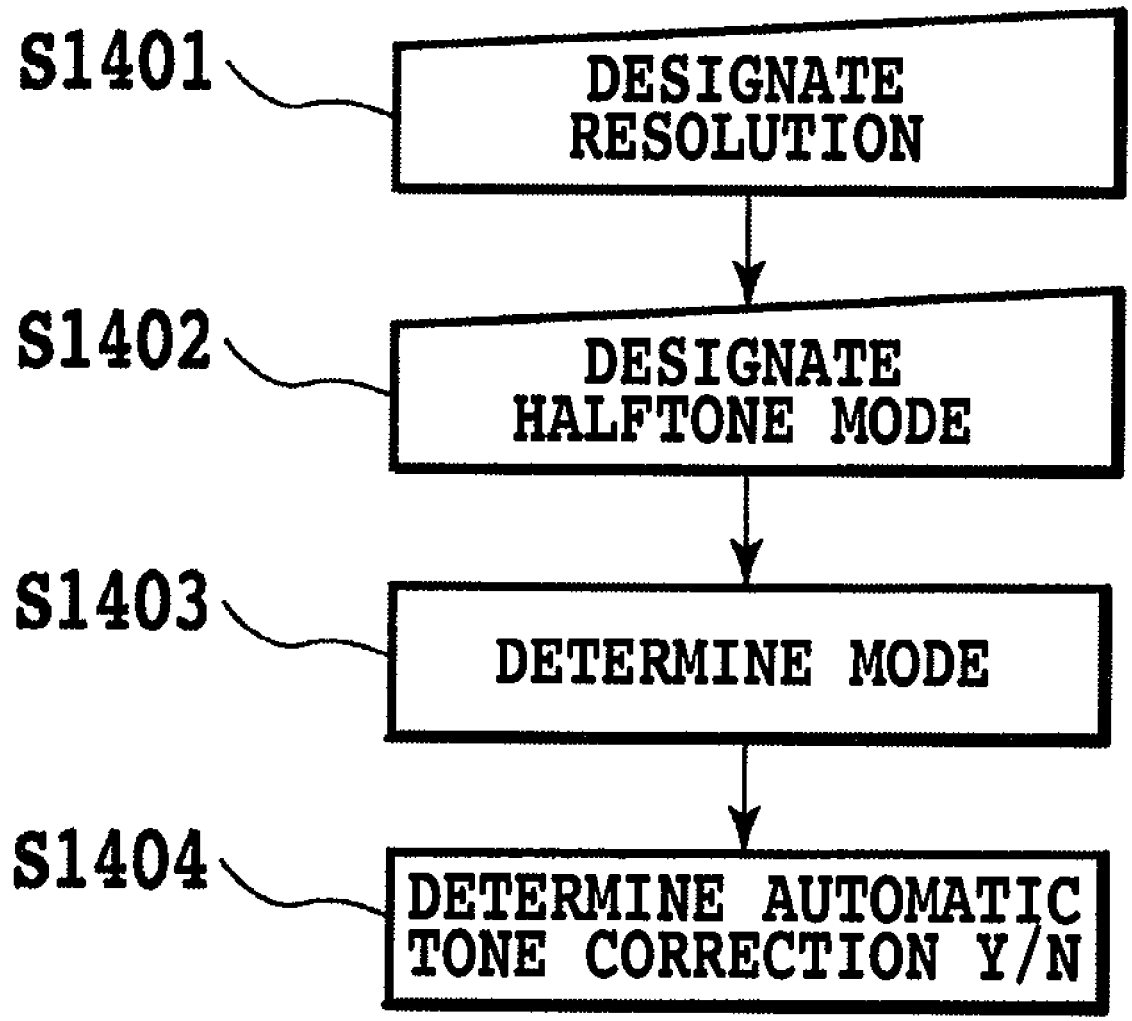
FIG. 14 is a flowchart in accordance with an embodiment of the present invention.

A third embodiment of the present invention will now be described using FIG. 14.

The processing shown in FIG. 14 and described hereinafter may be entirely executed by the CPU 111, for example.

In step S1401, a resolution for printing is designated.

Next, in step S1402, a halftone mode that configures screens for printing is designated.

Next, in step S1403, it is determined what kind of the halftone mode was designated in step S1402.

Next, in step S1404, the table shown in FIG. 15 is used to determine from the halftone mode determined in step S1403 whether or not automatic tone correction will be conducted during the print job.

Hereinafter, a concrete description of how it is determined in step S1404 whether or not to conduct automatic tone correction will be given by using FIG. 15.

For example, as shown in FIG. 15, if the job settings are PDL, a resolution of 600 dpi, and halftones rendered as tones, then screens are used only for tone screen in 600 dpi in PDL, and thus automatic tone correction is only conducted for tone screen in 600 dpi in PDL. In this case, a tone patch image is generated as shown in FIG. 19 by conducting halftone processing for a PDL 600 dpi tone screen. By then conducting the processing in FIG. 18, a tone correction lookup table for a PDL 600 dpi tone screen is created. Tone correction lookup tables are also created using a similar concept (i.e., technique) in cases other than the following embodiments 3, 4, and 5.

In other words, when conducting automatic tone correction during a print job as described in the foregoing, it is possible to shorten the processing time for conducting automatic tone correction by conducting automatic tone correction by creating only PDL 600 dpi tone screen lookup table.

As shown in the table shown in FIG. 15, if automatic tone correction is conducted for all screens, then automatic tone correction must be conducted for eight screens.

Herein, in the table shown in FIG. 15, two of the eight screens are copy (error diffusion screen) and copy (tone screen). In addition, in the table shown in FIG. 15, three of the eight screens are PDL (600 dpi, high resolution screen), PDL (600 dpi, resolution screen), and PDL (600 dpi, tone screen). In addition, in the table shown in FIG. 15, three of the eight screens are PDL (1200 dpi, high resolution screen), PDL (1200 dpi, resolution screen), and PDL (1200 dpi, tone screen).

According to the present embodiment, if the job settings are PDL, a resolution of 600 dpi, and halftones are rendered as tones, for example, then automatic tone correction is executed to create lookup table for the one screen marked "Y" among the eight screens, as shown in FIG. 15.

In addition, according to the present embodiment, if the job settings are PDL, a resolution of 600 dpi, and standard halftones, for example, then automatic tone correction is executed only for two screens among the eight screens, as shown in FIG. 15.

In addition, according to the present embodiment, if the job settings are PDL, a resolution of 1200 dpi, and standard halftones, for example, then automatic tone correction is executed only for two screens among the eight screens, as shown in FIG. 15.

In addition, according to the present embodiment, if the job settings are copy, and the original mode is text, for example, then automatic tone correction is executed only for one screen among the eight screens, as shown in FIG. 15.

In addition, according to the present embodiment, if the job settings are copy, and the original mode is photograph mode, for example, then automatic tone correction is executed only for one screen among the eight screens, as shown in FIG. 15.

In addition, according to the present embodiment, if the job settings are copy, and the original mode text/photograph, for example, then automatic tone correction is executed only for two screens among the eight screens, as shown in FIG. 15.

When conducting automatic tone correction during a print job in this way, the processing time for automatic tone correction can be shortened by conducted automatic tone correction only for the screens set to "Y" in FIG. 15.

(Embodiment 4)

A fourth embodiment of the present invention will now be described using the flowchart shown in FIG. 16.

The processing shown in FIG. 16 and hereinafter described may be entirely executed by the CPU 111, for example.

Figure 16:
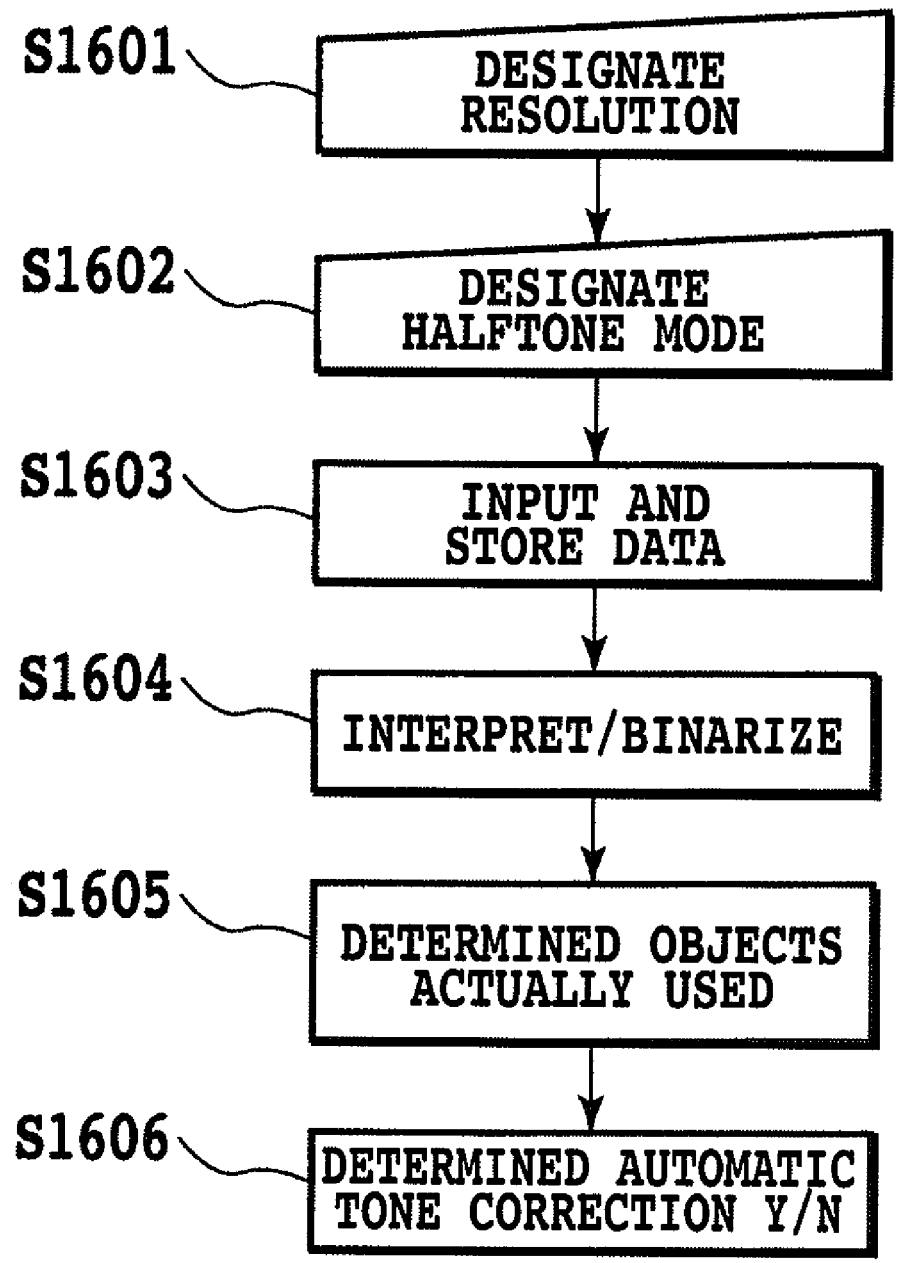
FIG. 16 is a flowchart in accordance with an embodiment of the present invention.

First, in step S1601 of FIG. 16, a resolution for printing is designated.

Next, in step S1602, a halftone mode that configures screen for printing is designated.

Next, in step S1603, PDL data is input into the MFP and stored.

Next, in step S1604, the PDL data that was input in step S1603 is PDL interpreted and binarized. When conducting the PDL interpretation and binarization in step S1604, dither matrix is changed so that different screens are switched to for each object included in the page.

Next, in step S1605, it is determined which objects were actually subjected to PDL interpretation and binarization in step S1604.

Next, in step S1606, FIG. 17 is used to determine, from the results of the determination in step S1604, whether or not automatic tone correction will be conducted during the print job.

Hereinafter, a concrete description of how it is determined in step S1606 of FIG. 16 whether or not to conduct automatic tone correction will be given by using FIG. 17.

In the following description, "Text" refers to text objects, "Graphic" refers to graphics objects, and "Image" refers to image objects.

As shown in FIG. 17, if the resolution is 600 dpi and halftones are rendered as tones, for example, then among the PDL objects, a tone screen is used for Text objects, a tone screen is used for Graphic objects, and a tone screen is used for Image objects, and thus tone screens are used for all PDL objects.

In addition, if the resolution is 600 dpi and halftones are rendered as tones, and if it is subsequently determined in step S1605 of FIG. 16 that only Text and Graphic screens are actually used during the print job, then processing like the following is conducted. More specifically, automatic tone correction is conducted only for the Text and Graphic screens (600 dpi, tone screen).

Similarly, as shown in FIG. 17, if the resolution is 600 dpi and standard halftones are used, then among the PDL objects, a high-resolution screen is used for Text objects, a tone screen is used for Graphic objects, and a tone screen is used for Image objects.

In addition, if the resolution is 600 dpi and standard halftones are used, then processing like the following is conducted. More specifically, if it is determined in step S1605 of FIG. 16 that only the Text screen is actually used during the print job, then automatic tone correction is conducted only for the Text screen (600 dpi, high-resolution screen).

Similarly, as shown in FIG. 17, if the resolution is 1200 dpi and halftones are rendered using pattern 7, for example, then among the PDL objects, a high-resolution screen is used for Text objects, a resolution screen is used for Graphic objects, and a tone screen is used for Image objects.

In addition, if the resolution is 1200 dpi and halftones are rendered using pattern 7, and if it is subsequently determined in step S1605 of FIG. 16 that Text, Graphic, and Image screens are actually used during the print job, then processing like the following is conducted. More specifically, automatic tone correction is conducted for the Text screen (1200 dpi, high-resolution screen n), the Graphic screen (1200 dpi, resolution screen), and the Image screen (1200 dpi, tone screen).

Similarly, if the resolution is 1200 dpi and halftones are rendered using pattern 7, and if it is subsequently determined in step S1605 of FIG. 16 that Text and Image screens are actually used during the print job, then processing like the following is conducted. More specifically, automatic tone correction is conducted for the Text screen (1200 dpi, high-resolution screen) and the Image screen (1200 dpi, tone screen).

Similarly, if the resolution is 1200 dpi and halftones are rendered using pattern 7, and if it is subsequently determined in step S1605 of FIG. 16 that an Image screen is actually used during the print job, then processing like the following is conducted. More specifically, automatic tone correction is conducted for the Image screen (1200 dpi, tone screen).

As described above, automatic tone correction is conducted only for the screens actually used during the print job, thereby shortening the time required for automatic tone correction.

(Embodiment 5)

Although Embodiment 4 is fundamentally applied to PDL output, Embodiment 5 is applied to copy output in a manner similar to that of Embodiment 4. When copying, an input print job is scanned by the monochrome reader 105 shown in FIG. 1, and then the tone characteristics and resolution of the resulting bitmap are corrected by the reader image processor 106.

Subsequently, the corrected bitmap is converted into binarized data by the binarization processor 107, and then stored in the HDD 108.

When applying automatic tone correction during a print job, automatic tone correction is applied by storing the scanned bitmap in the HDD and binarizing again with the binarization processor 107. The bitmap scanned as described above is equivalent to the PDL data in the PDL case, and the binarized data is the same as the PDL data. In other words, similar processing is conducted for both PDL output and copy output.

(Other Embodiments)

The present invention may furthermore be applied to a system made up of a plurality of devices (such as a computer, an interface device, a reader, and a printer, for example), or to an apparatus made up of a single device (such as a multi-function printer, a printer, or a fax machine).

The object of the present invention may also be achieved as the result of the computer (or CPU or MPU) of a system or device reading and executing program code for realizing the procedures in the flowcharts shown in the foregoing embodiments from a recording medium storing the program code. In this case, the program code itself that is read from the recording medium realizes the functions of the foregoing embodiments. For this reason, an embodiment of the present invention may also be configured as such program code, as well as a computer-readable storage medium having such program code stored or recorded thereon.

The storage medium for supplying the program code may be, for example, a Floppy™ disk, a hard disk, an optical disc, a magneto-optical disc, a CD-ROM, a CD-R, magnetic tape, a non-volatile memory card, or ROM.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-126146, filed May 13, 2008 which is hereby incorporated by reference herein in its entirety.

What is claimed is:

1. An image processing apparatus, comprising:
   a tone correcting unit for forming tone correction characteristics for bitmap data of a print job;
   a printing unit for printing tone-corrected bitmap data using the tone correction characteristics; and
   a designating unit for designating a text mode for printing by the printing unit,
   wherein the tone correcting unit does not form the tone correction characteristics while processing the print job designated as the text mode by the designating unit.

2. The image processing apparatus according to claim 1, wherein the processing is binarization.

3. The image processing apparatus according to claim 1, further comprising a storage unit for storing PDL data constituting the print job;
   wherein the PDL data is deleted if it is determined that the text mode is designated by the designating unit.

4. An image processing apparatus, comprising:
   a tone correcting unit for forming tone correction characteristics for bitmap data of a print job
   a printing unit for printing tone-corrected bitmap data using the tone correction characteristics; and
   a determining unit for determining whether the objects used in the print job are text objects,
   wherein the tone correcting unit does not form the tone correction characteristics while processing the print job.

5. An image processing apparatus, comprising:
   a tone correcting unit for forming tone correction characteristics for bitmap data of a print job;
   a printing unit for printing tone-corrected bitmap data using the tone correction characteristics; and
   a determining unit for determining whether or not the print job contains binary-only pages,
   wherein the tone correcting unit does not form the tone correction characteristics, depending on the results of the determination by the determining unit, and
   wherein PDL data constituting the print job is deleted if it is determined that the tone correcting unit does not form the tone correction characteristics.

6. An image processing method, comprising the steps of:
   forming tone correction characteristics for bitmap data of a print job;
   printing tone-corrected bitmap data using the tone correction characteristics; and
   designating a text mode for printing in the printing step,
   wherein the tone correction characteristics are not formed while processing the print job designated as the text mode at the designating step.

7. The image processing method according to claim 6, wherein the processing is binarization.

8. The image processing method according to claim 6, wherein PDL data constituting the print job to be printed is deleted if it is determined that forming the tone correction characteristics is not performed.

9. A non-transitory computer-readable storage medium storing a program which causes a computer to execute an image processing method comprising the steps of:
   forming tone correction characteristics for bitmap data of a print job;
   printing tone-corrected bitmap data using the tone correction characteristics; and
   designating a text mode for printing in the printing step,
   wherein the tone correction characteristics are not formed while processing the print job designated as the text mode at the designating step.

* * * * *